United States Patent [19]

Jameson et al.

[11] Patent Number: 4,937,431

[45] Date of Patent: Jun. 26, 1990

[54] APPARATUS FOR DISTRIBUTING A HEATED SCENT

[76] Inventors: Richard N. Jameson, R.R. 2, Box 80; Dana R. Cook, 1112 S. Elm, both of Pittsburg, Kans. 66762

[21] Appl. No.: 263,437

[22] Filed: Oct. 27, 1988

[51] Int. Cl.$^5$ .............................................. F22B 1/28
[52] U.S. Cl. .................................... 219/274; 219/272; 219/275; 239/59; 43/1
[58] Field of Search ............................... 219/271–276; 43/129, 1; 239/58, 59, 51.5

[56] References Cited

U.S. PATENT DOCUMENTS

| | | | |
|---|---|---|---|
| 611,560 | 9/1898 | Chambers | 43/129 |
| 2,959,354 | 11/1960 | Beck | 239/36 |
| 3,046,192 | 7/1962 | Bilyeu | 167/48 |
| 3,366,775 | 1/1968 | Mycue | 219/275 |
| 4,609,245 | 9/1986 | Sakschek | 239/36 |
| 4,722,477 | 2/1988 | Floyd | 239/36 |
| 4,735,010 | 4/1988 | Grinarml | 43/1 |
| 4,771,563 | 9/1988 | Easley | 43/129 |
| 4,773,178 | 9/1988 | Marek | 43/1 |

Primary Examiner—Teresa J. Walberg
Attorney, Agent, or Firm—John W. Carpenter

[57] ABSTRACT

An apparatus for producing heat to enhance an animal lure scent containing a hollow body, a base removably disposed to one end of the hollow body, and a body cap rotatably secured to another end of the hollow body. An electronic circuitry is disposed in the hollow body and includes a heat pot for supplying an odorless heat having a temperature of the body temperature of an animal to be lured. A scent pad is positioned against and over the heat pot to hold a scent of the animal to be lured and to insulate the heat pot during operation.

10 Claims, 3 Drawing Sheets

4,937,431

APPARATUS FOR DISTRIBUTING A HEATED SCENT

BACKGROUND OF THE INVENTION

1. Field of the Invention

This invention is related to an apparatus which produces heat to enhance a scent for attracting wild animals. More specifically, this invention provides for a scent dispenser which produces heat to enhance a scent having a temperature of the body temperature of the animal to be lured.

2. Description of the Prior Art

A patentability investigation was conducted and the following patents were discovered: U.S. Pat. No. 2,959,354 to Beck; U.S. Pat. No. 3,046,192 to Bilyeu; U.S. Pat. No. 4,609,245 to Sakschek; U.S. Pat. No. 4,722,477 to Floyd; and U.S. Pat. No. 4,735,010 to Grinarml. None of the foregoing prior art patents teach or suggest the particular dispensing apparatus of this invention. These foregoing prior art patents are all incorporated herein by reference.

SUMMARY OF THE INVENTION

The present invention accomplishes its desired objects by providing an apparatus for producing heat to enhance an animal lure scent. The apparatus has a hollow body with a first body end and a second body end. A base removably connects to the first body end. An electronic circuitry is disposed within the hollow body, and a heat pot means is also disposed within the hollow body and is electrically engaged to the electronic circuitry in order to supply an odorless heat having a temperature of the body temperature of an animal to be lured. A scent pad means is positioned against and over the heat pot means to hold a scent of the animal to be lured and to insulate the heat pot means during operation. The apparatus also includes a body cap that is rotatably secured to the second body end of the hollow body. The hollow body comprises a plurality of body apertures circumferentially positioned therethrough in close proximity to the scent pad means. The body cap comprises a plurality of body cap apertures that can be registered with the body apertures such that the scent of the animal to be lured can pass from the scent pad means, through the body apertures, and through the body cap apertures into the atmosphere.

It is therefore an object of the present invention to provide an apparatus which produces heat to enhance a scent for luring animals.

This, together with the various ancillary objects and features which will become apparent to those skilled in the art as the following description proceeds, are attained by this novel apparatus, a preferred embodiment being shown with reference to the accompanying drawings, by way of example only, wherein:

DETAILED DESCRIPTION OF THE INVENTION

Figure 1:
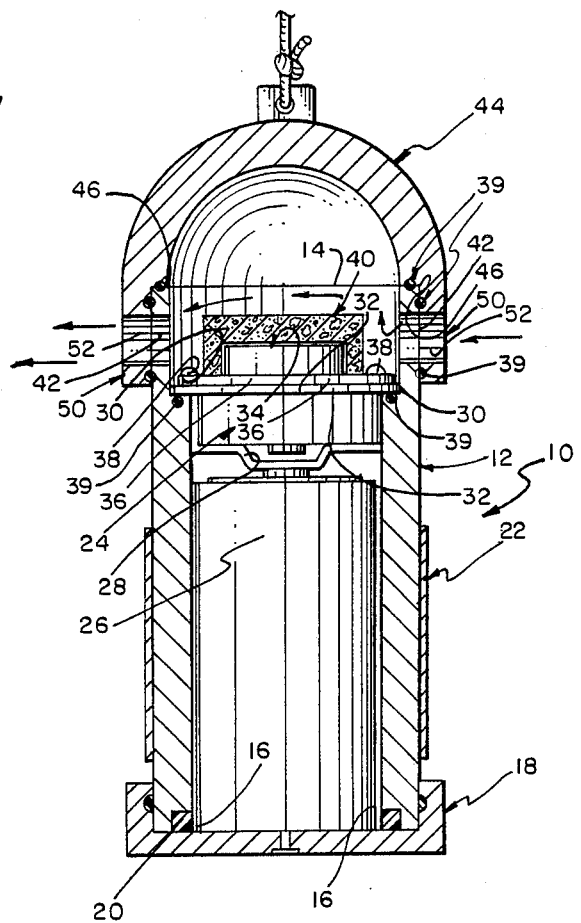
FIG. 1 is a partial vertical sectional view disclosing the internals of the apparatus of this invention.

Referring in detail now to the drawings wherein similar parts of the invention are identified by like reference numerals, there is seen an apparatus, generally illustrated as 10, for producing heat to enhance an animal lure scent. The apparatus or device 10 is formed to have a generally cylindrical hollow body 12 having an open top end 14 and an open bottom end 16. A body base 18 is removably disposed over the bottom end 16. A gasket or any sealing means 20 is positioned between the open bottom end 16 and the base 18 to form preferably an airtight seal. A name tag 22 (or any identification indicia) may be attached to the side of the hollow body 12.

Figure 3:
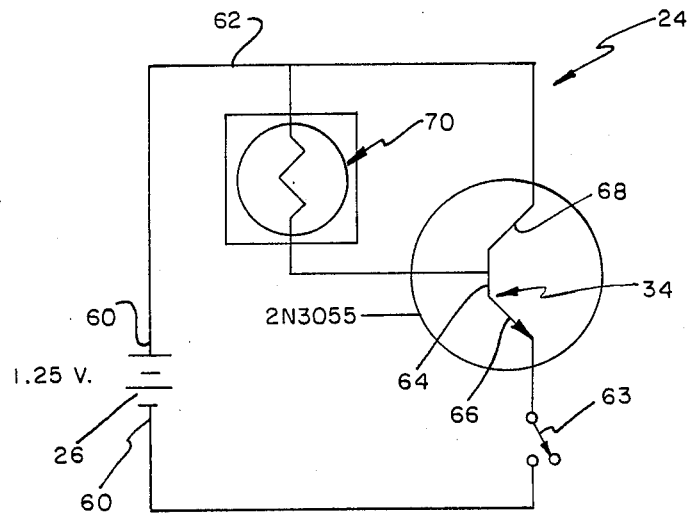
FIG. 3 is a schematic view of one embodiment electronic circuitry means for the apparatus of FIG. 1.
Figure 4:
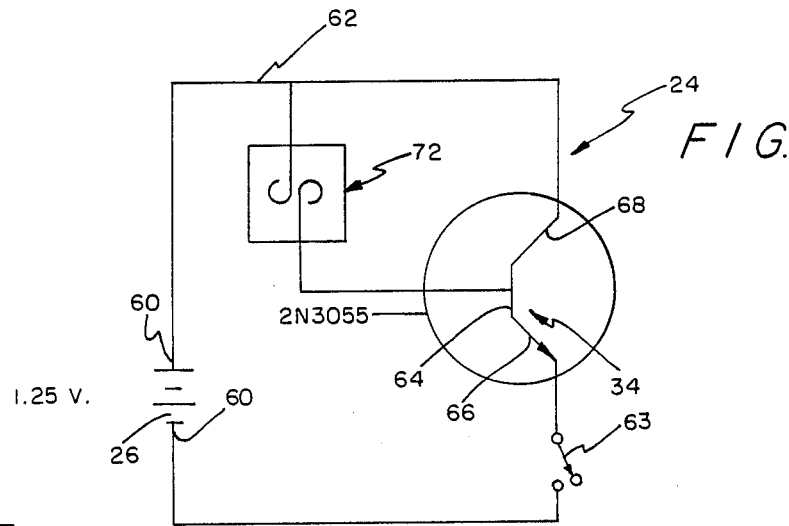
FIG. 4 is a schematic of another embodiment for the electronic circuitry means for the apparatus in FIG. 1.
Figure 5:
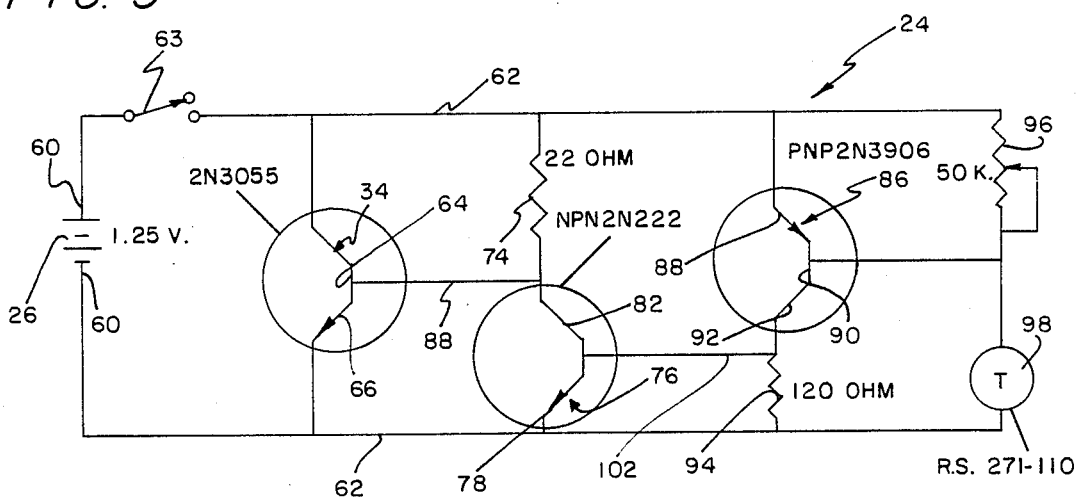
FIG. 5 is still yet another illustration of another embodiment of the electronic circuitry means for the apparatus in FIG. 1.

Situated inside the hollow body 12 is an electronic circuitry, generally illustrated as 24, and at least one power source means or battery 26 electrically connected to the electronic circuitry 24 via a contact plate 28. Electronic circuitry 24 has a number of preferred embodiments, all of which are illustrated in FIGS. 3, 4, and 5, and all of which will be described in detail below.

Open top end 14 is formed with a circular recess 30 along the periphery thereof. A circular body platform 32 seats into recess 30. Mounted on the circular body platform 32 is a heat pot, generally illustrated as 34. Heat pot 34 is electrically engaged to the electronic circuitry 24 and is preferably contained therein. Platform 36 supports the heat pot 34 which is for supplying an odorless heat having a temperature of the body temperature of the animal (e.g. deer, etc.) to be decoyed, simulated, or hunted. Platform 36 may be integrally secured to the heat pot 34 such that the heat pot 34 includes the platform 36, as opposed to being separate therefrom. Bolts 38—38 connect platform 36 to platform 32. A seal 39 is an impervious seal disposed between recess 30 and the bottom of platform 32 to seal unused scent when the apparatus 10 is not in use.

Figure 6:
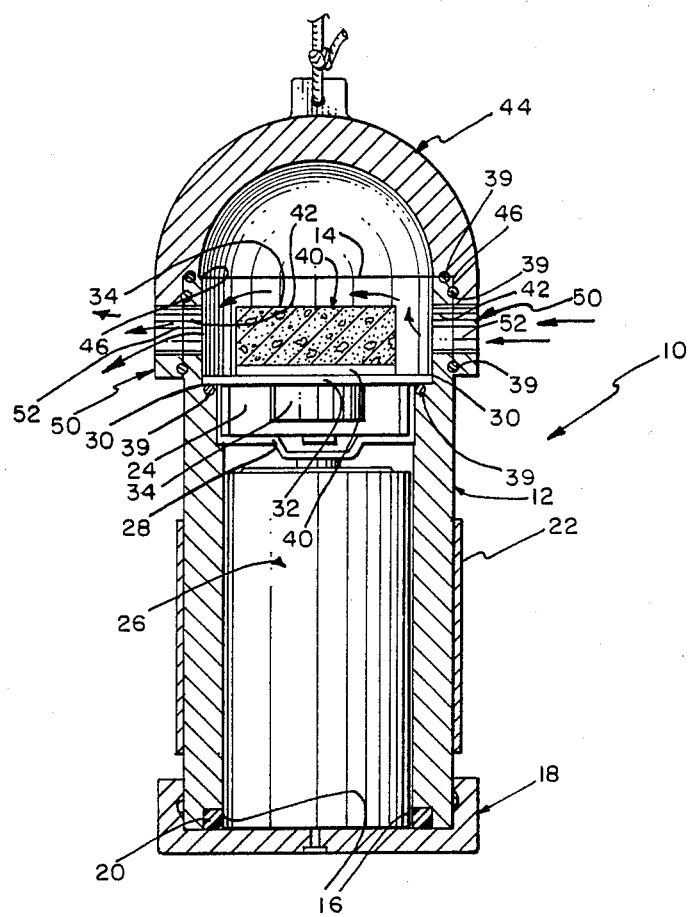
FIG. 6 is a horizontal sectional view of another embodiment of this invention disclosing the heat pot below the platform which is heated by the heat pot.

Superimposed to and on heat pot 34 is a scent pad means, generally illustrated as 40. Scent pad means 40 may be any absorbent felt pad or the like which is capable of holding scent and insulating the heat pot 34 during operation. More specifically, the scent pad means 40 may be any pad or the like containing a composition of matter which, when heated and propagated into the atmosphere as a scent, will result in attracting a particular animal toward the source of such scent. The scent from the scent pad means 40 can include a scent which is sexually stimulating to animals, a scent which will arouse the curiosity of such animals, and a scent which will be attractive from the standpoint of smell and/or taste. An example of an effective combination of substances which will sexually stimulate a wild animal includes an essence made from the pulverized musk or scent glands of a wild animal to which has been added the urine of one or more such animals. Preferably, as was previously indicated, the scent pad 40 to be most effective should be warmed or heated odorlessly at least to a temperature approximating the body temperature of such animal that is to be lured. It should be understood that the heat pot 34 may be disposed below platform 32 as indicated in FIG. 6. Such disposition would enable the heat pot 34 to heat the platform 32, which in turn would heat the scent pad means 40.

Figure 2:
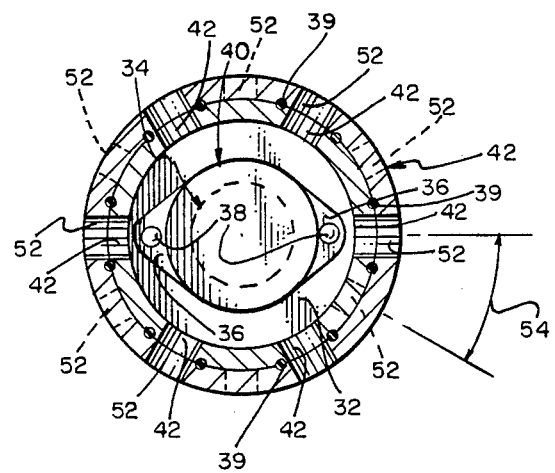
FIG. 2 is a horizontal sectional view of the apparatus of this invention disclosing the body apertures and the cap apertures in alignment such that scent can pass therethrough and into the atmosphere.

The cylindrical hollow body 12 of the apparatus 10 of this invention additionally comprises a plurality of apertures 42 circumferentially disposed through the structure thereof in close proximity to the open top end 14. Preferably, as best illustrated in FIG. 1, the apertures 42 are registered or aligned with the scent pad 40. Rotatably mounted on, to, and around the open top end 14 is a dome-shaped cap, generally illustrated as 44. Cap 44 has a recess 46 wherein the open top end 14 seats rotatably. As best illustrated in FIG. 1, seals 39 are disposed within recess 46 between the top end 14 and a lowermost portion of the cap 44, generally illustrated as 50, to seal in or otherwise enclose unused scent when the apparatus 10 of this invention is not being employed for its purpose. The lowermost portion 50 comprises a plurality of cap apertures 52 that can be aligned or registered with apertures 42 in order that the desired scent can be propagated and disseminated into the atmosphere. When it is desired to seal off or otherwise contain the scent within the apparatus 10, the cap 44 should be rotated through any desired arc, such as a clockwise rotation through arc 54 in FIG. 2, such that the solid, non-apertured portion of the lowermost portion 50 seals off apertures 42 and, in combination with the seals 39, causes the scent to remain underneath the cap 44.

As was indicated, the electronic circuitry 24 has a number of preferred embodiments, all illustrated in FIGS. 3, 4, and 5. In the preferred embodiment in FIG. 3, the ends 60—60 of a conductor 62 connect to battery 26 (preferably a NI-CAD battery, R.D. #23-140, 1.25 volts, 4.0 AH, D size). The conductor 62 contains connected in series therein off/on switch 63 and the heat pot means 34. While the heat pot means 34 of this invention may be any means which supplies odorless heat having a temperature approximating the temperature of the body of the animal to be lured, heat pot means 34 is preferably a power transistor 2N3055 having a base 64, an emitter electrode 66, and a collector electrode 68. An overtemperature protective switch 70 connects electrically to and between the conductor 62 and the base 64 of transistor 2N3055. The electronic circuitry 24 in the preferred embodiment of the invention in FIG. 4 is identical to the circuitry in FIG. 3 with the exception that the protective switch 70 is replaced with a thermal self-resettable fuse 72 which would also connect electrically to and between conductor 62 and the base 64 of transistor 2N3055 in FIG. 4.

The electronic circuitry 24 in the preferred embodiment of the invention in FIG. 5 contains in addition to battery 26, conductor 62, switch 63, and transistor 2N3055 (i.e., the heat pot means 34), the following electronic components: NPN 2N2222 transistor 76 having emitter electrode 78, base 80, and collector electrode 82; conductor 84; PNP 2N3906 transistor 86 having emitter electrode 88, base 90 and collector electrode 92; resistor 94; variable resistor 96 (i.e., a trimmer 50K pot); a thermistor 98 R.S. #271-110; a conductor 100; and a conductor 102. More specifically, the electronic circuitry 24 in FIG. 5 comprises the ends 60—60 of the conductor 62 connecting electrically to the battery such that the conductor 62 and the battery 26 form a continuous closed circuit. Switch 63, variable resistor 96, and thermistor 98 connect in series within and to conductor 62. Power transistor 2N3055 (or heat pot means 34) connects across conductor 62 such that the emittor electrode 66 attaches to conductor 62 between the thermistor 98 and the battery 26, and the collector electrode 68 connects to conductor 62 between the switch 63 and the variable resistor 96. Resistor 74 and transistor 76 are in series and connect across conductor 62 such that the emitter electrode end 78 of transistor 76 is engaged to conductor 62 between the point of connection of emitter electrode 66 to conductor 62 and the thermistor 98. The resistor 74 is engaged to conductor 62 between the point of contact collector electrode 68 to conductor 62 and the variable resistor 96. Conductor 84 connects from base electrode 64 of the transistor 2N3055 and to the point between resistor 74 and collector electrode 82 of transistor 76. Transistor 86 and resistor 94 are in series. Resistor 94 connects to conductor 62 between the point of connection of emitter electrode 78 to conductor 62 and the thermistor 98. The emitter electrode 88 of transistor 86 is engaged to conductor 62 between the variable resistor 96 and the point of engagement of resistor 74 to conductor 62. Conductor 100 is engaged from the base 90 of transistor 86 to conductor 62 between the variable resistor 96 and thermistor 98. Conductor 102 connects to base electrode 80 of transistor 76 and to a point between collector electrode 92 of transistor 86 and the resistor 94.

In operation of the electronic circuitry in FIG. 3, the overtemperature protector switch 70 acts as a solid state switch, which switches on and off the transistor 34 at a predetermined factory setting temperature. The overtemperature protector switch is mechanically mounted to the heating element package and measures the surface temperature of the transistor 34. When the temperature of the transistor 34 reaches a predetermined temperature, the overtemperature protector switch turns off the drive circuitry of the transistor 34. As the transistor 34 cools, so does the overtemperature protector switch 70, automatically resetting itself to once again control the temperature of the transistor 34 (or heating element). The protector switch 70 is a thermistor in a transistor package so it can be mounted to a power transistor package. The switch 70 is placed in the circuits so as to complete a self-biasing network for the transistor 34. The on/off switch 63 simply allows operator control for turning the device 10 on and off.

With respect to the electronic circuitry 24 in the preferred embodiment of FIG. 4, the overtemperature protector fuse 72 acts as a solid state switch, which switches on and off the transistor 34 at a predetermined factory setting temperature. The protector fuse 72 is mechanically mounted to the transistor 34 package. The protector fuse 72 measures the surface temperature of the transistor 2N3055 (or heating pot 34). When the temperature of the transistor 2N3055 reaches a predetermined temperature, the protector fuse 72 turns off the drive circuitry of the transistor 2N3055. Then, as the latter cools, so does the protector fuse 72, automatically resetting itself to once again control the temperature of the transistor 2N3055. The protector fuse 72 consists of two dissimilar metals joined so as to disconnect electrically when the temperature reaches a predetermined point, and resets itself when the temperature cools below this point. As was seen for the protective switch 70 in FIG. 3, the overtemperature fuse 72 is placed in the circuits so as to complete a self-biasing network for the transistor 2N3055. Again, the on/off switch 63 simply allows the operator control for turning the device 10 on and off.

Referring more specifically now to the circuitry diagram in FIG. 5, the variable resistor 76 (or trimmer 50K pot) is used with the thermistor 98 to form a universal bias circuit for the transistor 86. By setting the variable resistor 96, the temperature of the transistor 2N3055 (or heating pot 34) can be set for desired temperature setting. When the device 10 is initially turned on by switch 63, the transistor 2N3055 is switched on and starts to heat up until the desired temperature is reached. At this point, transistor 86 is turned off by the universal biasing network which, in turn, turns on transistor 76. The latter transistor 76 is configured as a common emitter circuit which controls the transistor 2N3055 (or heating element). When transistor 76 is on, it turns off the transistor 2N3055 (or heating element). The foregoing process is repeated again when the universal biasing network (variable resistor 96 and thermistor 98) detects that the transistor 2N3055 is below the predetermined temperature setting.

Thus, by the practice of this invention, there is provided a device 10 which is used to artificially duplicate or simulate the presence of a live animal. When used in conjunction with an animal's scent, the device 10 maintains the felt pad 40 at the body temperature of that animal. The scent is then heated to the animal's body temperature and gives off the smell of a live animal (a warm scent is more odoriferous than a cold scent). Being an electronic heat source, it is odorless, safe, and reusable. It could be used to enhance the fragrance of scents or foods used by targeted animal groups. By heating a scent or food to a temperature above the ambient temperature of its surroundings, moisture and molecules of scent are given off. Using wind as a vehicle, the odor is broadcast through the downwind area of the device, causing animals to respond much quicker to a live warm odor than to a cold scent odor.

The device 10 of this invention could be used to attract male animals to an area by duplicating the presence of the female of that species during the breeding season. It could also be used to duplicate the presence of a game bird to a dog being trained to hunt that species of game bird, or it could be used to warm extracts of food to attract animals where game laws do not allow baiting. It could also be filled with scent of certain game animals and dragged to lay a scent trail for trail hounds, or it could also be used by a hunter to mask human odor by filling it with a masking scent. There are numerous other uses of the device 10 of this invention which would be obvious to the artisans possessing the ordinary skills. By way of example, the device 10 of this invention may be employed to disseminate or propagate any scent, such as a fragrance for rest rooms or other household use; and the claims herein are not to be construed to limit the device 10 for the purpose of only luring animals.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. An apparatus for producing heat to enhance an animal lure scent comprising
    a generally cylindrical hollow body having a first body end and a second body end;
    a body base removably disposed on said first body end;
    electronic circuitry means disposed in said hollow body;
    heater means electrically engaged to said electronic circuitry means for supplying an odorless heat having a temperature of the body temperature of an animal to be lured;
    scent pad means positioned against and over the heater means to hold a scent of the animal to be lured and to insulate the heater means during operation; and
    a body cap rotatably secured to said second body end of said hollow body; said cylindrical hollow body comprises a plurality of body apertures circumferentially positioned therethrough in close proximity to said scent pad means; said body cap comprises a plurality of body cap apertures that can be registered with said body apertures such that the scent of the animal to be lured can pass from the scent pad means, through the body apertures, and through the body cap apertures into the atmosphere; said electronic circuitry means comprises a battery for a power source; said electronic circuitry means comprises a first conductor having a pair of first conductor ends electrically engaged to said battery such that said first conductor and said battery are capable of forming a continuous closed circuit; said first conductor having connected in series therein a switch means; a variable resistor means, and a thermistor means; and said heater means comprising a power transistor having a power base, a power emitter electrode and a power collector electrode; and an overtemperature protector switch means connected to said power base and to said first conductor.

2. The apparatus of claim 1 wherein said second body end has a structure defining a body recess.

3. The apparatus of claim 2 additionally comprising a platform member seated in said body recess.

4. The apparatus of claim 3 wherein said heat pot means and said scent pad means are supported by said platform member.

5. The apparatus of claim 4 wherein said body cap has a cap recess wherein said second body end rotatably seats.

6. A method for producing heat to enhance a scent comprising
    (a) a generally cylindrical hollow body having a first body end, a second body end, a body base removably disposed on the first body end, and a platform means disposed within the hollow body;
    (b) positioning an electronic circuitry means in the hollow body;
    (c) disposing heater means against and on the platform means;
    (d) positioning a scent pad means against the platform means;
    (e) rotatably engaging a body cap to the second body end; and
    (f) supplying power through the electronic circuitry means for heating the heater means such that the platform means is heated in order to cause the scent pad means to propagate and disseminate the scent; said electronic circuitry means comprises a first conductor having a pair of first conductor ends electrically engaged to said battery such that said first conductor and said battery are capable of forming a continuous closed circuit; said first conductor having connected in series therein a switch means, a variable resistor means, and a thermistor means; and said heater means comprises a power transistor having a power base, a power emitter electrode and a power collector electrode.

7. The method of claim 6 wherein said electronic circuitry means additionally comprises an overtemperature protector switch means connected to said power base and to said first conductor.

8. The method of claim 6 wherein said electronic circuitry means additionally comprises a thermal self-resettable fuse means connected to said power base and to said first conductor.

9. An apparatus for producing heat to enhance an animal lure scent comprising a generally cylindrical hollow body having a first body end and a second body end;

a body base removably disposed on said first body end;

electronic circuitry means disposed in said hollow body;

heater means electrically engaged to said electronic circuitry means for supplying an odorless heat having a temperature of the body temperature of an animal to be lured;

scent pad means positioned against and over the heater means to hold a scent of the animal to be lured and to insulate the heater means during operation; and a body cap rotatably secured to said second body end of said hollow body, said electronic circuitry means comprises a battery for a power source and a first conductor having a pair of first conductor ends electrically engaged to said battery such that said first conductor and said battery are capable of forming a continuous closed circuit; said first conductor having connected in series therein a switch means, a variable resistor means, and a thermistor means; and said heater means comprises a power transistor having a power base, a power emitter electrode and a power collector electrode; and a thermal self-resettable fuse means connected to said power base and to said first conductor.

10. An apparatus for producing heat to enhance an animal lure scent comprising a generally cylindrical hollow body having a first body end and a second body end;

a body base removably disposed on said first body end;

electronic circuitry means disposed in said hollow body;

heater means electrically engaged to said electronic circuitry means for supplying an odorless heat having a temperature of the body temperature of an animal to be lured;

scent pad means positioned against and over the heater means to hold a scent of the animal to be lured and to insulate the heater means during operation; and a body cap rotatably secured to said second body end of said hollow body, said electronic circuitry means comprises a first conductor having a pair of first conductor ends electrically engaged to said battery such that said first conductor and said battery are capable of forming a continuous closed circuit; said first conductor having connected in series therein a switch means, a variable resistor means, and a thermistor means; said heat pot means comprising a power transistor having a power base, a power emitter electrode secured to said first conductor between said battery and said thermistor, and a power collector electrode connected to said first conductor between said switch means and said variable resistor means; a first transistor means having a first emitter electrode connected to said first conductor and further having a first collector electrode and a first base; a first resistor means connected to said first collector electrode and to said first conductor; a second conductor connected to said power base and to said first collector electrode; a second transistor means having a second emitter electrode secured to said first conductor means, a second base, and a second collector electrode; a second resistor means secured to said second collector electrode and to said first conductor; a third conductor connected to said first base and to said second collector electrode; a fourth conductor connected to said second base and to said first conductor between said variable resistor means and said thermistor.

* * * * *